US009560470B2

(12) United States Patent
Grost et al.

(10) Patent No.: US 9,560,470 B2
(45) Date of Patent: Jan. 31, 2017

(54) UPDATING A VEHICLE HEAD UNIT WITH CONTENT FROM A WIRELESS DEVICE

(71) Applicant: GM Global Technology Operations LLC, Detroit, MI (US)

(72) Inventors: Timothy J. Grost, Clarkston, MI (US); Cody R. Hansen, Shelby Township, MI (US); Karen Juzswik, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 60 days.

(21) Appl. No.: 14/267,408

(22) Filed: May 1, 2014

(65) Prior Publication Data

US 2015/0319551 A1 Nov. 5, 2015

(51) Int. Cl.
| | |
|---|---|
| *H04M 1/00* | (2006.01) |
| *H04W 4/00* | (2009.01) |
| *H04L 29/08* | (2006.01) |
| *H04B 1/3822* | (2015.01) |
| *H04M 1/725* | (2006.01) |
| *H04M 1/2745* | (2006.01) |
| *H04M 1/60* | (2006.01) |

(52) U.S. Cl.
CPC ........... *H04W 4/003* (2013.01); *H04B 1/3822* (2013.01); *H04L 67/12* (2013.01); *H04L 67/2842* (2013.01); *H04L 67/34* (2013.01); *H04M 1/7253* (2013.01); *H04M 1/274516* (2013.01); *H04M 1/6091* (2013.01)

(58) Field of Classification Search
USPC ........................ 455/412.1, 414.2, 418, 569.1, 569.2, 455/575.9
See application file for complete search history.

(56) References Cited

U.S. PATENT DOCUMENTS

| | | | | |
|---|---|---|---|---|
| 7,786,895 B2* | 8/2010 | Zoladek | ................. | G07C 5/008 340/438 |
| 9,185,402 B2* | 11/2015 | Wu | ....................... | H04N 17/002 |
| 2003/0187577 A1* | 10/2003 | McClure | ............... | A01B 69/008 701/23 |
| 2004/0082350 A1* | 4/2004 | Chen | ....................... | H04L 63/10 455/518 |
| 2007/0226778 A1* | 9/2007 | Pietruszka | ............ | H04L 63/104 726/2 |
| 2008/0132204 A1* | 6/2008 | Ziolko | ................... | H04W 12/04 455/411 |

(Continued)

FOREIGN PATENT DOCUMENTS

EP 1760984 * 7/2007

*Primary Examiner* — Dai A Phuong
(74) *Attorney, Agent, or Firm* — Christopher DeVries; Reising Ethington P.C.

(57) ABSTRACT

A communications system and method of operating a vehicle multi-tainment unit (VMU) within that communications system is disclosed. The method includes the steps of: (a) establishing a connection between the VMU and a mobile device; (b) retrieving from a cache associated with the VMU user data previously provided by the mobile device; (c) prior to receiving current user data from the mobile device, receiving via the connection recently-used user data from the mobile device; (d) comparing the previously-provided user data and the received recently-used data; and (e) updating the previously-provided user data based on the comparison.

17 Claims, 4 Drawing Sheets

(56) References Cited

U.S. PATENT DOCUMENTS

| | | | |
|---|---|---|---|
| 2009/0182496 A1* | 7/2009 | Tanabe | G01C 21/32 701/532 |
| 2011/0301837 A1* | 12/2011 | Wellmann | G01C 21/3446 701/410 |
| 2012/0117198 A1* | 5/2012 | Bolduc | G06F 9/541 709/219 |
| 2013/0310018 A1* | 11/2013 | Faenger | H04W 8/24 455/420 |
| 2015/0220992 A1* | 8/2015 | Brown | G06Q 30/0261 705/14.58 |
| 2016/0028867 A1* | 1/2016 | Lee | H04M 1/6091 455/414.1 |
| 2016/0239293 A1* | 8/2016 | Hoffman | G06F 8/65 |

\* cited by examiner

UPDATING A VEHICLE HEAD UNIT WITH CONTENT FROM A WIRELESS DEVICE

TECHNICAL FIELD

The present invention generally relates to vehicle head unit services, and more specifically to communicating with the vehicle head unit via a mobile device.

BACKGROUND

Vehicle occupants increasingly desire greater access to entertainment data and applications while in their vehicles. Vehicles are capable of storing some of this data or applications. At other times, it may be desirable to acquire this data from a remote source.

For a number of years, entertainment data was received by a vehicle head unit via analog radio waves enabling vehicle occupants to listen to a variety of AM and FM radio stations. More recently, improvements to vehicle head units have enabled more modern head units to receive digital data including cloud server data and/or satellite radio.

SUMMARY

According to an embodiment of the invention, there is provided a method of operating a vehicle multi-tainment unit (VMU). The method includes the steps of: (a) establishing a connection between the VMU and a mobile device; (b) retrieving from a cache associated with the VMU user data previously provided by the mobile device; (c) prior to receiving current user data from the mobile device, receiving via the connection recently-used user data from the mobile device; (d) comparing the previously-provided user data and the received recently-used user data; and (e) updating the previously-provided user data based on the comparison.

According to another embodiment of the invention, there is provided a method of operating a vehicle multi-tainment unit (VMU). The method includes the steps of: (a) establishing a connection between the VMU and a mobile device; (b) retrieving from a cache associated with the VMU user data previously provided by the mobile device; (c) prior to receiving an entire up-to-date user database from the mobile device, receiving via the connection a recently-used sub-database of the up-to-date user database from the mobile device; (d) comparing the previously-provided user data and the received recently-used sub-database; and (e) updating the previously-provided user data based on the comparison.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The method below describes a vehicle multi-tainment unit (VMU, e.g., a device providing infotainment and/or entertainment services) that is inter-operable with a portable, mobile device (e.g., a Smart phone) via a wired or wireless connection. Upon connecting with the mobile device, the mobile device may make recently-used content available to the VMU (e.g., via a data upload), thereby enabling vehicle user(s) to access the content via the VMU. And while the VMU ultimately may access a variety of content stored on the mobile device (as it is eventually uploaded), uploading the recently-used content may be given priority over the remaining content. Thus, uploading the recently-used content first may make the recently-used content accessible or usable via the VMU sooner; i.e., rather than making it available only after all or much of the remaining content is uploaded.

As will be appreciated by skilled artisans, the VMU may store or cache previously uploaded content for future use. However, for example, when the VMU and mobile device are connected in the future, the entire contact list of the mobile device may need to be uploaded and indexed by the VMU before any new phone number or new email may be accessed and/or used by the VMU. Or for example, the entire media list of the mobile device may need to be uploaded and indexed by the VMU before any new song or new video may be accessed and/or played by the VMU. Described herein are several embodiments enabling a vehicle user faster access to new content on the mobile device (i.e., content not previously cached by the VMU). This may be desirable to vehicle user(s), as user(s) access the new content with greater frequency than older (cached) content. For example, a recently added phone number may be more likely to be called than many older numbers. Or for example, a recently added song may be more likely to be played than many older songs.

Prior to presenting the method embodiments, at least one embodiment of a communications system in which the methods may be carried out is described. The described communications system below is not meant to limit the method embodiments to only the described communications system, rather the described communication system is merely one example. Other communications system embodiments will be appreciated by skilled artisans.

Communications System—

Figure 1:
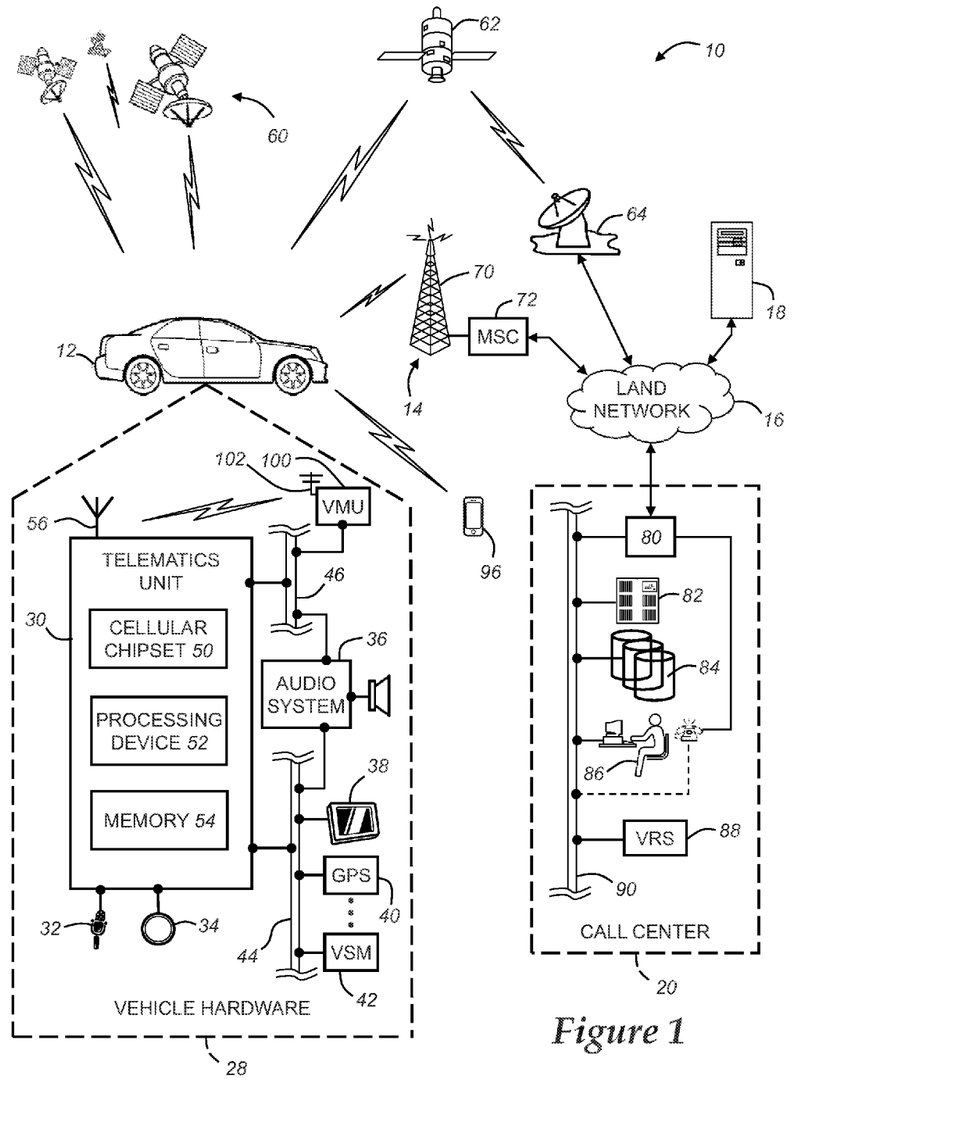
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It will be appreciated that GSM or CDMA standards illustrate merely exemplary implementations and other standards are also possible (e.g., LTE). It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices (including a mobile device 96) can also be carried out using telematics unit 30. For this purpose, telematics unit 30 can be configured to communicate wirelessly according to one or more suitable wireless protocols (e.g., WiMAX, ZigBee™, etc.), including any other short range wireless communication (SRWC) such as any suitable Wi-Fi standard (e.g., IEEE 802.11), Wi-Fi Direct or other suitable peer-to-peer standard, Bluetooth, wireless infrared transmission, or various combinations thereof. Thus, SRWC should be construed broadly to include WiMAX, ZigBee™, Wi-Fi, Wi-Fi Direct, Bluetooth, etc. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Figure 2:
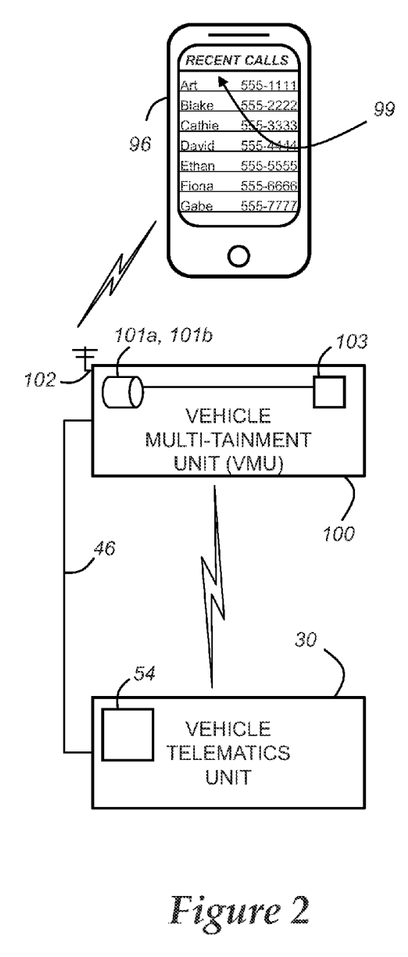
FIG. 2 is a block diagram illustrating a connection between a mobile device and a vehicle multi-tainment unit.

The vehicle electronics 28 (as shown in FIGS. 1 and 2) may also include a communication device such as a vehicle multi-tainment unit (VMU) or vehicle head unit 100 which, in some embodiments, may include some of the vehicle electronics previously discussed (e.g., the audio system 36, the visual display 38, etc.). As used herein, the VMU 100 may include all suitable electronics, software, etc. for providing one or more user data services, vehicle entertainment services, and/or vehicle infotainment services to the vehicle users and/or occupants. The VMU may include memory 101a, 101b coupled to a processor or processing device 103. The characteristics and functional properties of the processor 103 and memory 101a, 101b may be similar to the afore-described processor 52 and memory 54, respectively. In addition, memory 101a and 101b may be portions or sections of a single memory device. In at least one embodiment, the memory 101a, 101b may store cache or cached data. And in at least one specific embodiment, memory 101a may store cached contact content (e.g., name, address(es), phone number(s), email(s), etc.), and memory 101b may store cached media content (e.g., audio file(s) (including songs, speech, sounds, etc.), visual file(s) (including images, video, graphics, etc.), and/or audio-visual file(s)).

In some instances, the VMU 100 is electronically coupled to (and in communication with) the telematics unit 30 (e.g., via bus 46). The unit 100 may be modular or may be embedded within the vehicle 12. In addition, the VMU 100 may be integrated (e.g., a fixture) within the vehicle or in some circumstances may be detachably fixed or detachably tethered. Where the VMU 100 is detachable, the device may be operable both inside and outside of the vehicle. Furthermore, the VMU 100 may have an antenna 102 coupled to a SRWC module therein (e.g., a Bluetooth or Wi-Fi Direct module). Examples of VMUs include interactive displays in the vehicle dashboard, interactive displays embedded within the backing of vehicle seating or the vehicle headliner, and other interactive vehicle devices/displays that are portable.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

The operating environment may further include one or more handheld communications devices (HCDs) or mobile devices 96 (FIGS. 1 and 2). The mobile device may be an electronic device which may be used to make mobile telephone calls across a wide geographic area where transmissions are facilitated by the wireless carrier system 14 (i.e., when the mobile device is connected to the wireless carrier system).

The mobile device may further include: hardware, software, and/or firmware enabling cellular telecommunications and communications via short-range wireless communication (e.g., Wi-Fi Direct and Bluetooth) as well as other mobile device applications. The hardware of the mobile device 96 may comprise: a processor and memory (e.g., non-transitory computer readable medium configured to operate with the processor) for storing the software, firmware, etc. The mobile device processor and memory may enable various software applications, which may be preinstalled or installed by the user (or manufacturer) (e.g., having a software application or graphical user interface or GUI). One commercial implementation of a vehicle-mobile device application may be RemoteLink™, enabling a vehicle user to communicate with the vehicle 12 and/or control various aspects or functions of the vehicle—e.g., among other things, allowing the user to remotely lock/unlock vehicle doors, turn the vehicle On/Off, check the vehicle tire pressures, fuel level, oil life, etc. RemoteLink™ may also allow the user to connect with the call center 20 or the call center advisor 86 at any time.

The mobile device hardware also may include a display, a keypad (e.g., push button and/or touch screen), a microphone, one or more speakers, motion-detection sensors (such as accelerometers, gyroscopes, etc.), and a camera.

In addition to the aforementioned features, modern mobile devices may support additional services and/or functionality such as short messaging service (SMS or texts), multimedia messaging service (MMS), email, internet access, as well as business and gaming applications.

Non-limiting examples of the mobile device 96 include a cellular telephone, a personal digital assistant (PDA), a Smart phone, a personal laptop computer or tablet computer having two-way communication capabilities, a netbook computer, a notebook computer, or any suitable combinations thereof. The mobile device 96 may be used inside or outside of a mobile vehicle (such as the vehicle 12 shown in FIG. 1), and may be coupled to the vehicle by wire or wirelessly (e.g., using short range wireless communication). The mobile device also may be configured to provide services according to a subscription agreement with a third-party facility or wireless/telephone service provider. It should be appreciated that various service providers may utilize the wireless carrier system and that the service provider of the telematics unit 30 may not necessarily be the same as the service provider of the mobile devices 96.

The mobile device 96 and the vehicle 12 may be used together by a person known as the vehicle user such as a vehicle driver or a vehicle passenger. However, the vehicle user does not need to have ownership of the mobile device 96 or the vehicle 12 (e.g., the vehicle user may be an owner or a licensee of either or both).

Method—

Figure 3:
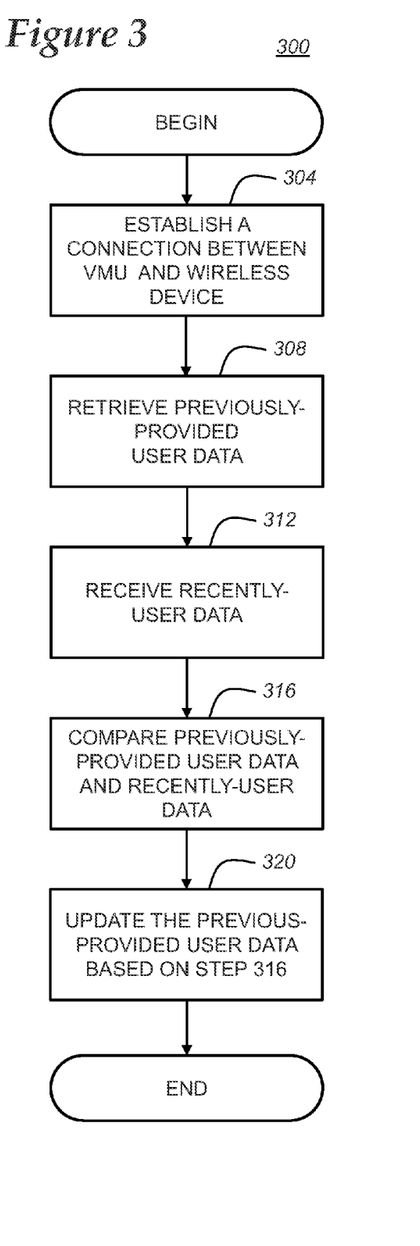
FIG. 3 is a flow diagram depicting an embodiment of the method of the present invention.

Turning now to FIG. 3, there is one illustrative method 300 of operating the VMU 100. The method begins with step 304 which establishes a connection between the VMU 100 and the mobile device 96. This connection may be wired or wireless. In at least one embodiment, the connection is according to short range wireless communication (SRWC).

The SRWC may include various protocols and procedures by which the VMU 100 and mobile device 96 recognize one another and establish a secure session, as will be appreciated by skilled artisans.

Next in step 308, the method may retrieve previously-provided user data from cached memory or database 101*a*, 101*b*. For example, prior to step 308, the mobile device 96 may provide user data to the VMU 100 (e.g., by SRWC), and the VMU may store it in memory 101*a*, 101*b*. Thus, in step 308, the VMU 100 may retrieve or call-up this previously-provided user data from memory 101*a*, 101*b*. As used herein, the phrase previously-provided user data may include any data that may be used and/or configured by the user in (or via) the mobile device 96 and that is stored on or at memory in the mobile device 96. In one example, user data includes a contacts list (e.g., a phone and/or address book) stored in the mobile device, and the contacts list may comprise a number of contact units or records, each contact unit comprising one or more sub-units. For example, each contact unit may include a person's name or a business name, at least one phone number, at least one address, etc. In another example, user data includes a media list (e.g., a song and/or video inventory) stored in the mobile device, and the media list may comprise a number of media units or files.

Continuing, the method 300 may perform step 312. In step 312, the VMU 100 may receive via the connection recently-used data (e.g., from a recently-used sub-database), from the mobile device 96. This step may occur before, during, or after step 308. Moreover, step 312 may occur automatically after step 304. Recently-used data may include any user data (e.g., including stored and/or configurable data) that has been recently used or recently accessed on the mobile device by user. In one example illustrated in FIG. 2, the recently-used data 99 is a Recent Calls listing in the mobile device 96. Thus, by way of example, recently-used data includes a recently-called phone number, a recently-received phone call, a set of phone numbers on the recently-called list, a recently-updated or recently-changed phone number, a recently-updated address, a recently-added contact unit, etc. Further, recently-used data also includes a recently-added media unit, a recently-purchased media unit, a recently-played media unit, etc.

In one embodiment of step 312, the VMU 100 receives the recently-used data piecemeal; e.g., one recently-used or accessed contact unit (or media unit or suitable unit or sub-unit) at a time. In another embodiment, the VMU receives the recently-used data in its entirety; e.g., all recently-used contact units (and/or media units and/or other suitable units or sub-units) at the same time.

After receiving at least one recently-used data unit in step 312, the method 300 may compare the previously-provided user data (called-up from memory 101*a*, 101*b*) to the recently-used data (e.g., the at least one unit or even sub-unit). If all or a portion of the at least one unit is already in the memory 101*a*, 101*b*, the VMU 100 may do nothing.

However, if the at least one unit or sub-unit is not already in the memory 101*a*, 101*b*, the VMU 100 may update the previously-provided user data with the recently-used data (step 320). For example, in steps 316 and 320, if the recently-used data includes a phone number (e.g., from the Recent Calls list) not previously cached in memory 101*a*, then the VMU 100 may update the contact unit in the memory 101*a* with the new phone number. Or for example, in steps 316 and 320, if the recently-used data includes a media unit (e.g., an MP3 song file from a Recent Playlist) not previously cached in memory 101*b*, then the VMU 100 may update the media unit to the memory 101*b*.

The newly updated contact or media unit may then be available for use by the vehicle user via the VMU 100 while the remaining recently-used data is being updated and/or indexed with the previously-provided user data. For example, the vehicle user may use the VMU 100 to call the new phone number. Or for example, the vehicle user may play via the VMU 100 the new song file.

The steps 308-320 may be repeated. For example, in embodiments where the recently-used data is provided piecemeal, another unit may be provided from the mobile device 96 to the VMU 100, and the unit may be compared and updated, if appropriate, according to the method previously described.

In method 300, the user data has been illustrated using contact and media units. However, other user data is possible also, and will be appreciated by skilled artisans.

Figure 4:
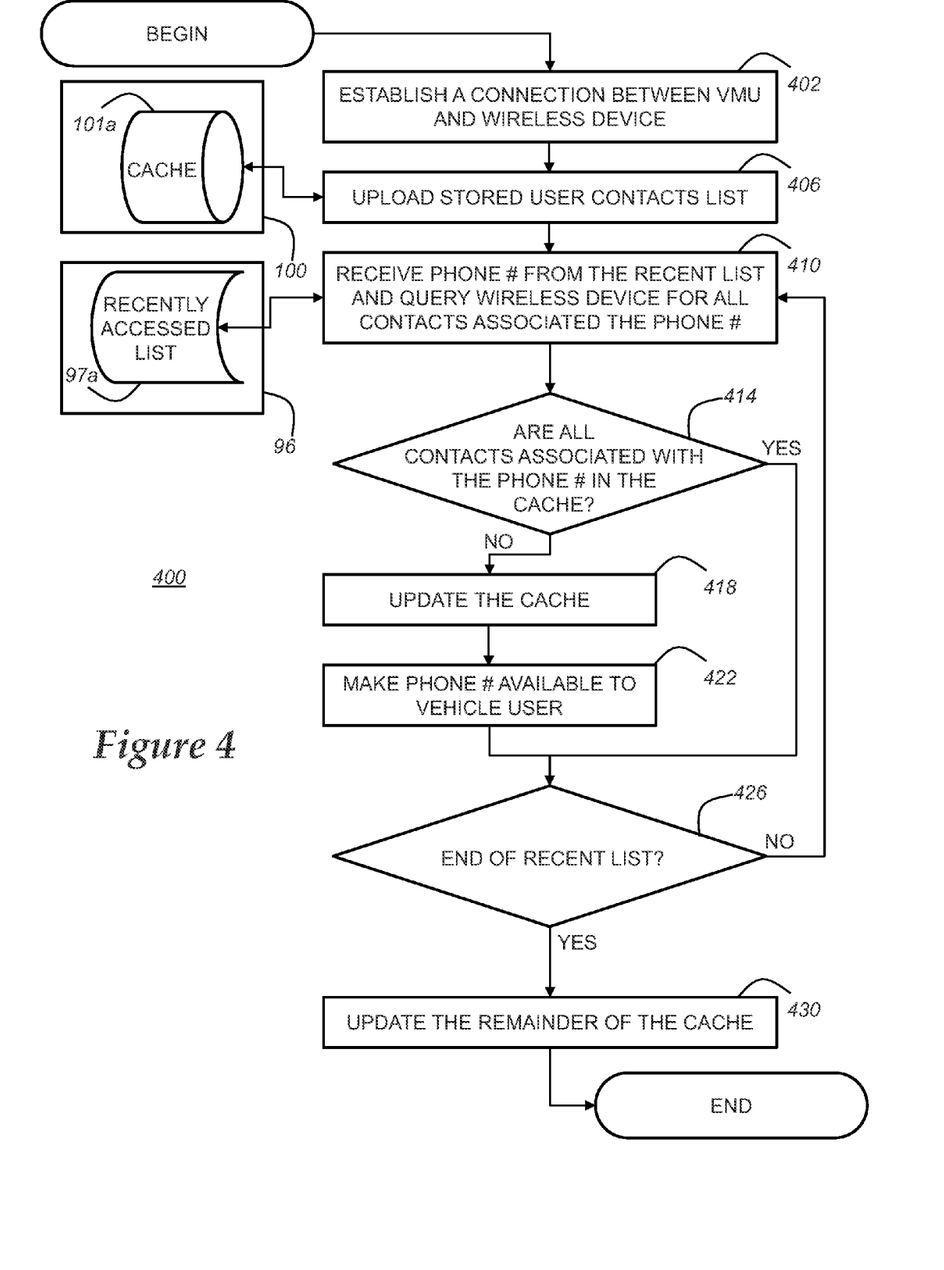
FIG. 4 is a flow diagram depicting another embodiment of the method of the present invention.

Now turning to FIG. 4, this figure illustrates a specific implementation pertaining to a user contacts list. A method 400 begins with step 402 establishing a connection between the VMU 100 and the mobile device 96. This step may be similar to the previously described step 304 (FIG. 3) and will not be re-discussed here.

Thereafter, the method 400 proceeds to step 406 where a user contacts list is uploaded from the VMU memory 101*a*. This user contacts list may be the previously-provided user data described above.

Thereafter, the method may proceed to step 410 where a phone number is received by the VMU from the Recent Calls List stored in memory 97*a* of the mobile device 96. Step 410 may further include the VMU 100 querying the mobile device 96 for all contacts (or contact units) associated with the phone number.

Next, the VMU may make a comparison in step 414. For example, the VMU 100 may determine whether all contacts associated with the phone number are in the cached memory 101*a*. If all contacts are already in the memory 101*a*, then the method 400 may proceed to step 426. If not, the method may proceed to step 418.

In step 418, the VMU 100 may update the cached memory 101*a* with the phone number received in step 410.

And in step 422, the phone number may be thereafter immediately available for use by the vehicle user(s). Then, the method 400 may proceed to step 426.

In step 426, the method 400 may determine whether the entire Recent Calls List has been compared against the previously-provided user data from memory 101*a*. If the method has not reached the end of the List, the method may proceed to step 414 (and steps 414, 418, 422, and/or 426 may be repeated). If the method 400 has reached the end of the List, the method may proceed to step 430.

In step 430, having updated the previously-provided user data to the VMU 100, the VMU may upload and index the remainder of the Contacts List on the mobile device 96; i.e., all the current or up-to-date user data on the mobile device 96. For example, all new contacts and/or phone numbers not on the Recent Calls List may be uploaded and stored in the cached memory 101*a*. Skilled artisans will appreciate that the amount of time consumed during this step may be undesirably long and inconvenient; however, the method 400 has quickly made available one or more newly added phone numbers that are likely to be called by the vehicle user using the VMU 100, thus by-passing the wait time associated with step 430.

Having updated the memory 101*a*, the updated memory 101*a* may become the previously-provided user data the next time method 400 is executed; e.g., the next time the vehicle user enters the vehicle 20 with the mobile device 96.

Figure 5:
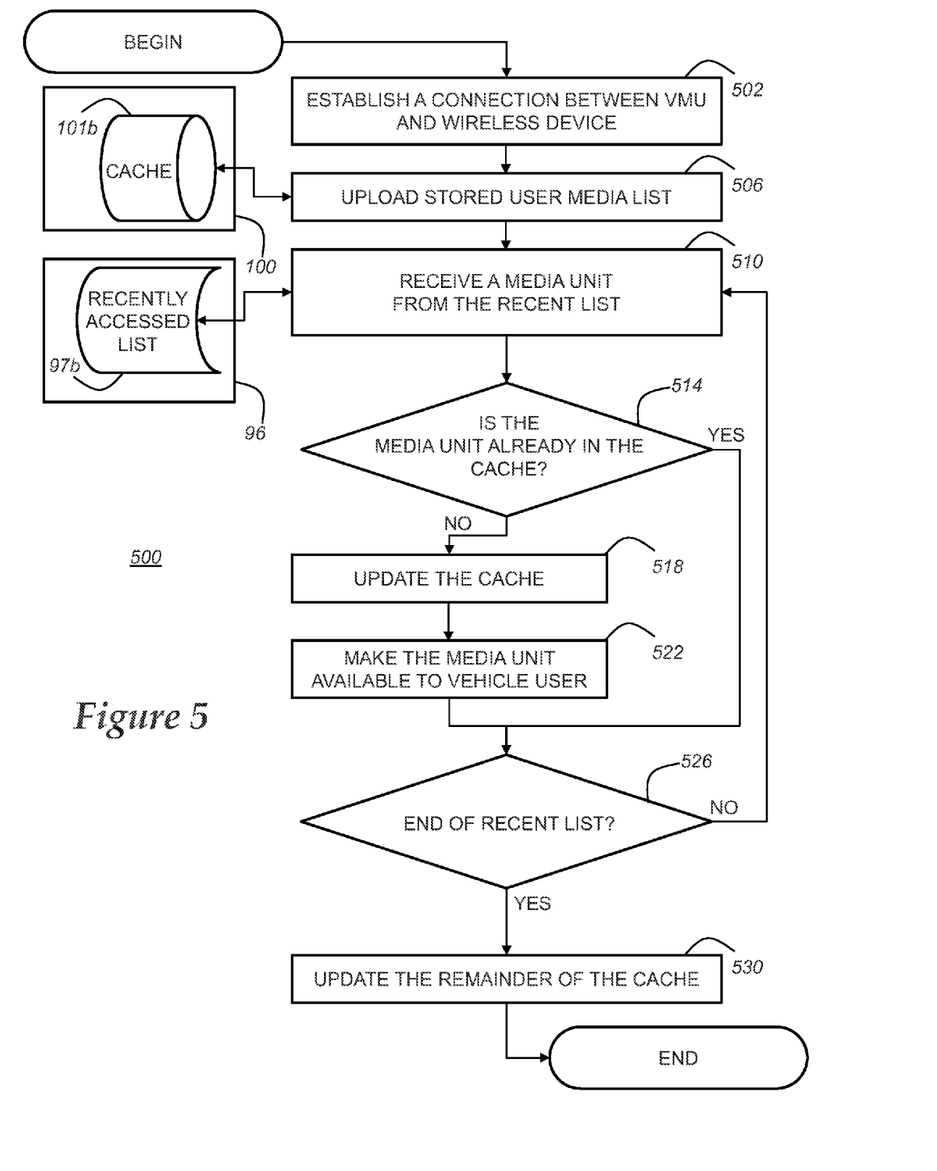
FIG. 5 is a flow diagram depicting another embodiment of the method of the present invention.

Method 500 shown in FIG. 5 is similar to method 400 shown in FIG. 4; therefore, like reference numerals indicate identical or similar features or functions. Method 500 pertains to a Media List (instead of the Recent Calls List), and not all of the steps 502-530 will be described below in their entirety.

For example, step 502 is the same as step 402. And steps 506 is similar to step 406, except instead a media list is uploaded (i.e., again, previously-provided user data).

In step 510, the VMU 100 receives a media unit from a recently-used list 97b stored on the mobile device 96. The recently-used list may include a list of recently-added media units, a list of recently-purchased media units, a list of recently-played media units, etc.

And steps 514-530 may all be similar to the corresponding steps of method 400, except again that the method 500 pertains to media units.

It should be appreciated that in instances where there is no previously-provided user data, the present disclosure will still enhance the speed of the initial connection process by targeting the recently-used user data.

Thus, there has been described various methods for expediting the availability and use of newly added content of the mobile device 96 to the VMU 100.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of operating a vehicle multi-tainment unit (VMU), comprising the steps of:
   (a) establishing a connection between the VMU and a mobile device;
   (b) retrieving from a cache associated with the VMU a first set of user data that was previously provided by the mobile device;
   (c) prior to receiving a second set of user data from the mobile device, receiving via the connection a data subset of the second set of user data from the mobile device, wherein the second set of user data includes data currently available to a user of the mobile device, wherein the data subset includes one or more data units most recently available for use on the mobile device by the user;
   (d) determining whether the one or more data units of the data subset are contained with the first set of user data; and
   (e) when it is determined in step (d) that at least one of the one or more data units are not contained within the first set of user data, then updating the first set of user data in the cache to include the at least one of the one or more data units.

2. The method of claim 1, wherein the connection between the VMU and the mobile device is either wired or via short range wireless communication (SRWC).

3. The method of claim 1, wherein the first set of user data includes at least one of: a previously-provided contact list having a plurality of contacts or a previously-provided media list having a plurality of media units.

4. The method of claim 3, wherein the at least one of the one or more data units of the data subset includes at least one recently-used contact unit accessed by the mobile device or at least one recently-used media unit accessed by the mobile device.

5. The method of claim 4, wherein the recently-used contact unit is associated with a recently-called list stored in the mobile device.

6. The method of claim 4, wherein the recently-used media unit is associated with at least one of: a recently-added media unit, a recently-purchased media unit, or a recently-played media unit.

7. The method of claim 4, wherein the recently-used media unit includes an audio file, a visual file, or an audio-visual file.

8. The method of claim 4, wherein step (d) further comprises:
   determining whether the at least one recently-used contact unit is found within the first set of user data stored within the cache, wherein step (e) further comprises: when the at least one recently-used contact unit is not stored within the cache, then adding the at least one recently-used contact unit to the cache.

9. The method of claim 4, wherein step (d) further comprises:
   determining whether the at least one recently-used media unit it is found within the first set of user data stored within the cache, wherein step (e) further comprises: when the at least one recently-used media unit is not stored within the cache, then adding the at least one recently-used media unit to the cache.

10. The method of claim 4, wherein step (d) further comprises:
    (f) after updating the first set of user data with the data subset, receiving via the connection a remainder of the second set of user data from the mobile device; and then
    (g) updating the first set of user data with the remainder of the second set of user data.

11. A method of operating a vehicle multi-tainment unit (VMU), comprising the steps of:
    (a) establishing a connection between the VMU and a mobile device;
    (b) retrieving from a cache associated with the VMU a first set of user data that was previously provided by the mobile device;
    (c) prior to receiving an entirety of a second set of user data from the mobile device, receiving via the connection a data subset of the entirety of the second set of user data from the mobile device, wherein the second set of user data includes data currently available to a user of the mobile device, wherein the data subset includes one or more data units most recently available for use on the mobile device by the user;
(d) determining whether the one or more data units of the data subset are contained with the first set of user data;
(e) when it is determined in step (d) that at least one of the one or more data units are not contained within the first set of user data, then updating the first set of user data in the cache to include the at least one of the one or more data units;
(f) following step (e), receiving at the VMU via the connection a remainder of the second set of user data from the mobile device, wherein the remainder includes the second set of user data less the data subset; and
(g) updating the cache using the remainder of the second set of user data.

12. The method of claim 11, wherein the at least one of the one or more data units of the data subset includes at least one recently-used contact unit accessed by the mobile device or at least one recently-used media unit accessed by the mobile device.

13. The method of claim 12, wherein the recently-used contact unit is associated with a recently-called list stored in the mobile device.

14. The method of claim 12, wherein the recently-used media unit is associated with at least one of: a recently-added media unit, a recently-purchased media unit, or a recently-played media unit.

15. The method of claim 12, wherein the recently-used media unit includes an audio file, a visual file, or an audio-visual file.

16. The method of claim 12, wherein step (d) further comprises: determining whether the at least one recently-used contact unit is found within the first set of user data stored within the cache, wherein step (e) further comprises: when the at least one recently-used contact unit is not stored within the cache, then adding the at least one recently-used contact unit to the cache.

17. The method of claim 12, wherein step (d) further comprises:
determining whether the at least one recently-used media unit it is found within the first set of user data stored within the cache, wherein step (e) further comprises: when the at least one recently-used media unit is not stored within the cache, then adding the at least one recently-used media unit to the cache.

* * * * *